United States Patent

[11] 3,628,799

[72] Inventor Winfred J. Wiese
 Whittier, Calif.
[21] Appl. No. 3,836
[22] Filed Jan. 19, 1970
[45] Patented Dec. 21, 1971
[73] Assignee Borg-Warner Corporation
 Chicago, Ill.

[54] MECHANICAL SEAL ASSEMBLY WITH LEAKAGE CONTROL
 5 Claims, 3 Drawing Figs.

[52] U.S. Cl. ........................................... 277/27,
 277/74, 277/75
[51] Int. Cl. ........................................... F16j 15/40,
 F16j 15/44
[50] Field of Search ........................................... 277/74, 75,
 27

[56] References Cited
 UNITED STATES PATENTS

| | | | |
|---|---|---|---|
| 2,930,636 | 3/1960 | Tracy | 277/27 |
| 3,318,604 | 5/1967 | Tracy | 277/27 |
| 3,433,489 | 3/1969 | Wiese | 277/74 |
| 3,486,760 | 12/1969 | Tracy | 277/74 |

*Primary Examiner*—Samuel Rothberg
*Attorneys*—Donald W. Banner, William S. McCurry and John W. Butcher ABSTRACT: A mechanical seal assembly having a rotary sealing ring and a nonrotatable sealing ring carried by a housing flange, including fluid-pressure-responsive means for compensating for flange distortion to thereby control warpage of the sealing surface of the nonrotatable sealing ring to regulate leakage between the cooperating sealing surfaces of the sealing rings.

INVENTOR
WINFRED J. WIESE
BY John O. Evans, Jr.
ATTORNEY

MECHANICAL SEAL ASSEMBLY WITH LEAKAGE CONTROL

BACKGROUND OF THE INVENTION

1. Field of the Invention

This invention relates to mechanical seals having means associated with the nonrotatable sealing ring for automatically controlling the leakage of fluid through the gap between the opposed sealing surfaces of the relatively rotating sealing rings.

2. Description of the Prior Art

In one known type of mechanical seal assembly, the stationary sealing ring is carried by a support flange mounted on a housing. The pressure of fluid within the housing exerts a force on the support flange that deforms it. Deformation of the flange is reflected in a corresponding distortion of the nonrotatable sealing ring carried by the flange. When the nonrotatable sealing ring is distorted, the sealing face thereof is warped. This changes the shape of the leakage gap between the sealing surface of the nonrotatable sealing ring and the cooperating sealing surface of the rotary sealing ring. The shape of the leakage gap is charged in a manner to decrease the rate of fluid leakage through the gap with resultant heating of and damage to the sealing rings.

In my prior U.S. Pat. No. 3,433,489, issued Mar. 18, 1969, I have disclosed a mechanical seal including means associated with the rotary sealing ring for controlling the flow of fluid between the relatively rotating sealing faces of the seal.

SUMMARY OF THE INVENTION

An object of this invention is to provide in a mechanical seal assembly means for automatically correcting for distortion of the nonrotatable sealing ring occasioned by distortion of the flange that supports the nonrotatable sealing ring or sealing ring assembly.

The present invention resides in a mechanical seal assembly for sealing a rotary shaft to a housing having a shaft opening through which the shaft extends, the mechanical seal assembly including: rotatable sealing ring means mounted on the shaft for rotation therewith, the rotatable sealing ring means having limited movability axially of the shaft; nonrotatable sealing ring means; the rotatable and nonrotatable sealing ring means having opposed, generally radial sealing surfaces disposed in relatively rotatable sealing relationship; the housing having a support flange surrounding the shaft, the flange supporting the nonrotatable sealing ring means on its side opposite to its generally radial sealing surface and along an annular surface spaced radially inward from its outer periphery; the flange and the nonrotatable sealing ring means defining therebetween an annular cavity disposed radially outward from the annular surface; means for sealing the cavity; the nonrotatable sealing ring means having a cantilevered peripheral portion that is free to flex into the cavity; the peripheral portion having a first, generally radial annular surface contiguous to the cavity and exposed to the pressure fluid therein, and a second, generally radial surface on the opposite side of the peripheral portion and exposed to the pressure of the fluid within the housing; and fluid passage means extending through the nonrotatable sealing ring means and opening, at one of its ends, into the space between the sealing surfaces and, at the other of its ends, into the cavity. Preferably, the nonrotatable sealing ring means is a composite structure including a backup ring supported by the flange, and backup ring in turn supporting the nonrotatable sealing ring proper. In this preferred form of the invention, the backup ring provides the cantilevered peripheral portion with its first and second generally radial surfaces.

DESCRIPTION OF THE PREFERRED EMBODIMENT

Figure 1:
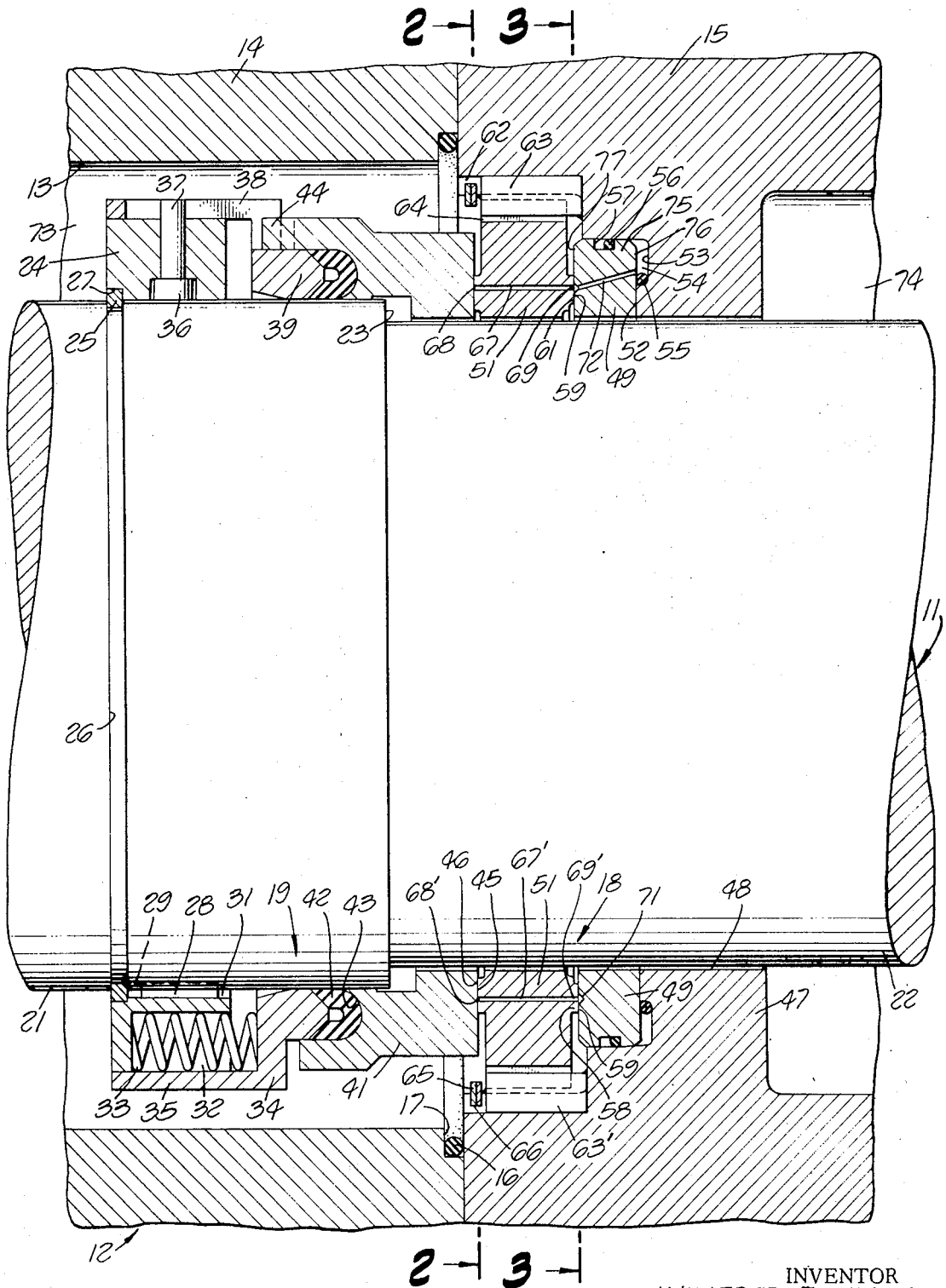
FIG. 1 is an axial sectional view of a mechanical seal assembly embodying the invention.
Figure 2:
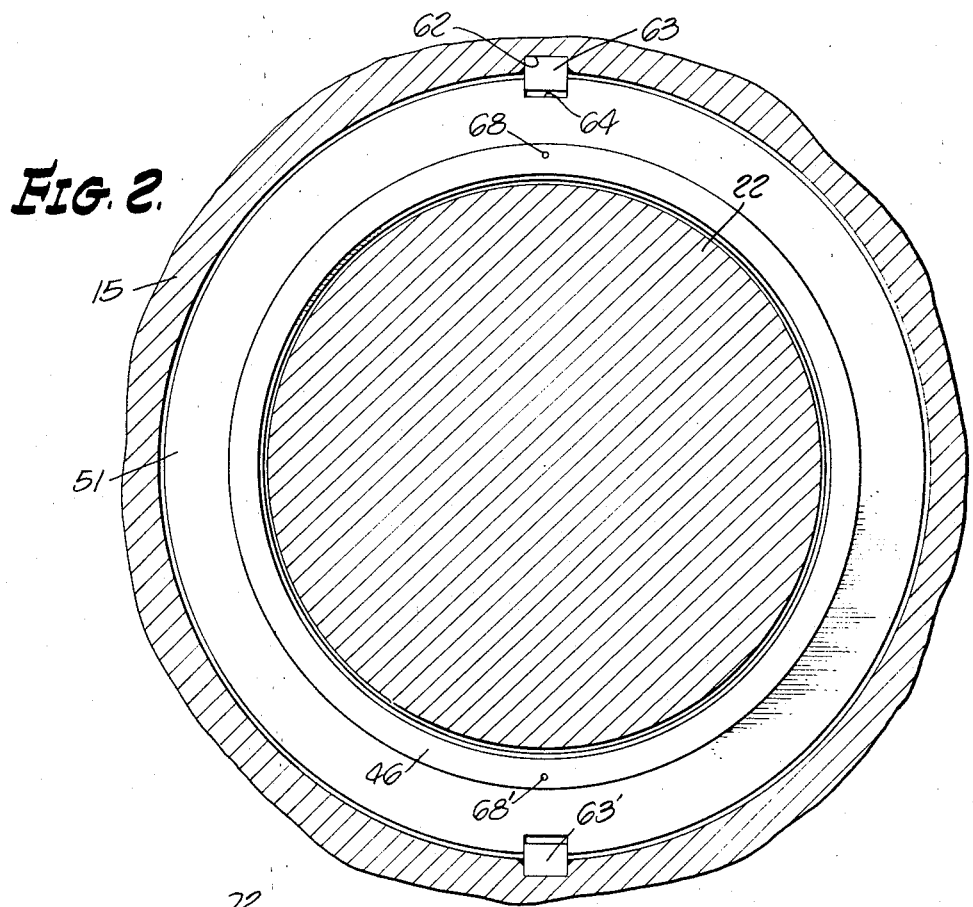
FIG. 2 is a sectional view on a reduced scale taken along the line 2—2 of FIG. 1 and looking in the direction of the arrows.
Figure 3:
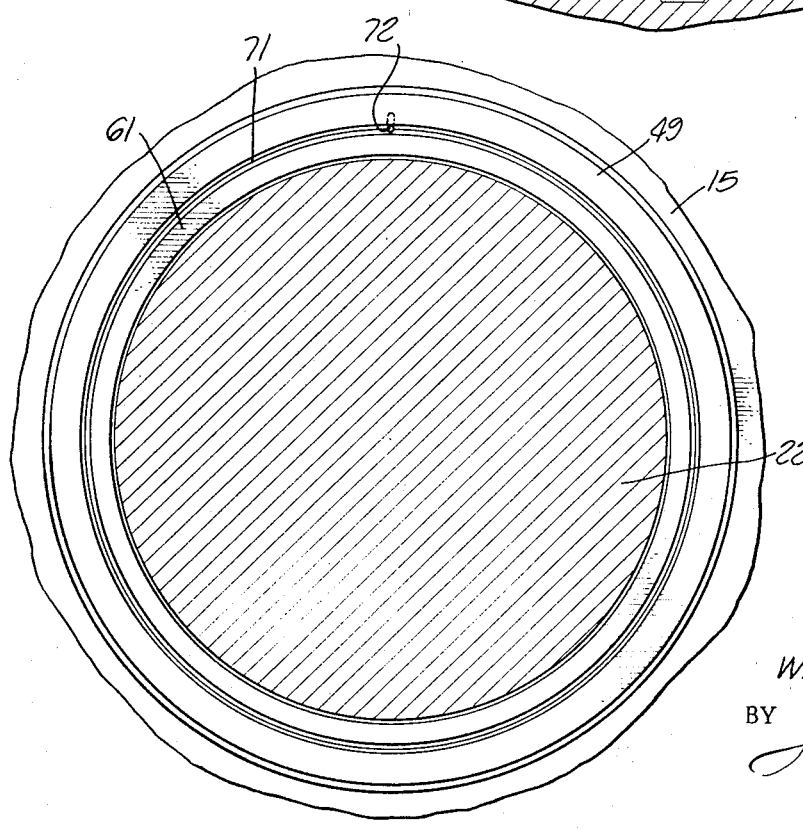
FIG. 3 is a sectional view on the same scale as FIG. 2 taken on the line 3—3 of FIG. 1 and looking in the direction of the arrows.

Referring to the drawings, wherein like reference numerals designate corresponding parts in several views, the mechanical seal assembly shown therein functions to seal a shaft 11 to a housing 12, the shaft being mounted for rotation on bearings (not shown) and extending through a shaft opening 13 in the housing. The housing 12 has two housing portions 14 and 15, the housing portions being secured together by suitable means, such as bolts (not shown). The housing portions 14 and 15 are sealed against leakage through the joint therebetween by an O-ring gasket 16 received in a slot 17 provided in the housing portion 14.

A stationary sealing ring subassembly, designated by the general reference numeral 18, is mounted on the housing portion 15, and a cooperating rotary sealing ring subassembly, designated by the general reference numeral 19, is mounted on the shaft 11 and in opposed sealing relationship with the stationary sealing ring subassembly.

As shown in FIG. 1, the shaft 11 has a shaft section 21 at the left that is of somewhat greater diameter than the shaft section 22 at the right, the shaft having a shoulder or step 23 between the foregoing shaft sections. Mounted on the larger shaft section 21 is a spring holder 24, the spring holder being in the form of an annular member that encircles the shaft. A split retaining ring 25 is carried in a groove 26 in the shaft 11 and is received in an opposed groove 27 formed in the spring holder 24. It is apparent that the retaining ring 25 holds the spring holder against movement to the left along the shaft, as seen in FIG. 1. The spring holder is driven or rotated by the shaft through a key 28 fitted into a keyway 29 in the shaft and into a corresponding slot 31 in the spring holder. The spring holder is provided with a longitudinally extending spring pockets 32, only one of which appears in the drawing, the spring pockets being located circumferentially of the spring holder. Helical springs 33 are compressed into the spring pockets and bear upon a U-cup follower 34 to urge it to the right, as seen in FIG. 1. The U-cup follower is an annular member having a skirt 35 that slides longitudinally on the outer periphery of the spring holder 24. A drive pin 36 extends radially through the spring holder and has its outer end 37 projecting into a longitudinal slot 38 in the U-cup follower, whereby the U-cup follower is caused to rotate with the spring holder, yet is free to slide longitudinally of the spring holder. The U-cup follower has an annular nose 39, the inner circumference of which slides along the shaft.

Slidably mounted on the shaft section 21 is a rotary sealing ring 41, there being a U-cup gasket 42 interposed between the nose 39 of the U-cup follower and a rearwardly facing surface 43 of the rotary sealing ring. Thus, fluid is prevented by the gasket from leaking through the clearance between the shaft section 21 and the rotary sealing ring 41.

At the rear of the rotary sealing ring 41 is an integral tang 44 that projects into the longitudinal slot 38 of the U-cup follower 34 through which means the rotary sealing ring is driven by the U-cup follower; yet the rotary sealing ring may slide, within limits, longitudinally along the shaft.

The rotary sealing ring 41 has a radially extending annular sealing surface 45 disposed in relatively rotatable sealing relationship with a corresponding sealing face 46 on the stationary sealing ring subassembly 18.

The stationary sealing ring subassembly 18 is mounted upon and carried by a support flange 47 that is integral with the housing portion 15 and that projects generally radially inward toward the shaft section 22. The flange is annular, and its inner periphery 48 is spaced slightly from the shaft section 22.

The stationary sealing ring means or subassembly 18, is in the exemplary embodiment shown in the drawings, a composite structure including a backup ring 49 and a stationary sealing ring 51. The backup ring 49 is disposed in a recess 52 provided in the flange 47, this recess being further extended at 53 to form, with the backup ring an annular chamber 54. An O-ring gasket 55 within the chamber 54 seals against leakage of fluid from the chamber radially inward through the joint between the backup ring and the flange. Another O-ring gasket 56, disposed in a peripheral groove 57 in the backup ring, seals against passage of fluid into the chamber 54 along the joint between the outer periphery of the backup ring and the flange.

Disposed between the backup ring 49 and the rotary sealing ring 41 is the stationary sealing ring 51. The latter has an annular projection 58 that abuts the backup ring 49, there being a lapped, fluidtight joint therebetween formed by a sealing surface 59 on the projection 58 and a complementary sealing surface 61 on the backup ring.

A keyway 62 is provided in the housing portion 15, the keyway facing the outer periphery of the stationary sealing ring. A key 63 is secured in this keyway, as by welding. The key projects into a longitudinal slot 64 in the outer periphery of the stationary sealing ring. It will be obvious that rotation of the stationary sealing ring in the housing portion 15 is thereby prevented.

A key 63 is disposed diametrically opposite the key 63 and is constructed and arranged to lock the stationary sealing ring against rotation in the housing portion 15.

A spiral snap ring 65 is received in a groove 66 in the housing portion 15, the radially inner part of the snap ring serving to retain the stationary sealing ring 51 in this housing portion when the mechanical seal assembly is taken apart. Upon removal of the snap ring from its groove, the stationary sealing ring can be withdrawn from the housing portion 15.

The stationary sealing ring has a pair of oppositely disposed, axial fluid passages 67 and 67 extending therethrough. One end 68 or 68 of each passage opens One the sealing face 46 of the stationary sealing ring. The other end 69 or 69 of each passage opens into the sealing surface 59 of the annular projection 58 on the opposite side of the stationary sealing ring. The backup ring 49 has an annular collector groove 71 in its sealing surface 61, this collector groove being in fluid communication with the passages 67 and 67 . A fluid passageway 72 extends through the backup ring 49 to thereby place the collector groove 71 in fluid communication with the annular chamber 54. If desired, collector groove may be placed in the sealing surface 59 of the ring 51. The rings 41, 51, and 49 may be made of conventional materials; by way of example, the rotary sealing ring 41 and the backup ring are of stainless steel and the nonrotatable sealing ring 51 is of carbon.

The operation of the mechanical seal assembly shown in the drawings and thus far described, will now be explained. A liquid, such as water, is within the housing portion 14 and in communication with the seal cavity 73 to the left of the mechanical seal assembly, as viewed in FIG. 1. The cavity 74 to the right of the mechanical seal assembly may be open to the atmosphere or it may contain liquid, such as water, at a pressure substantially lower than the liquid in the seal cavity 73.

As the shaft 11 rotates, the rotary sealing ring is turned relative to the stationary sealing ring 51. Owing to the pressure drop across the sealing interface 45, 46 from its radially outer circumference to its radially inner circumference, a small amount of liquid will flow from the seal cavity 73 through the sealing interfaces 45, 46 and thence along the shaft 11 and into the cavity 74. Such leakage is normal and desired, as it serves to lubricate sealing faces 45 and 46 and to keep them running cool.

If there is a great difference in pressure between the fluid in the seal cavity 73 and fluid in the cavity 74, for example a difference in pressure of 750 p.s.i., a force of large magnitude will be developed across the flange 47. This force will distort the flange 47, causing it to become slightly dished with its concave configuration facing the higher pressure side, i.e. the side toward the seal cavity 73. Such dishing is small in the absolute sense, but may involve significant deflections of a few thousandths of an inch at the radially inner periphery 48 of the flange.

If the stationary sealing ring subassembly 18 were merely mechanically supported by the flange 47, such dishing of the flange would be transmitted through the backup ring 49 and hence into the stationary sealing ring 51. This would cause the sealing face 46 of the stationary sealing ring to become warped into a slightly dished configuration, with its concave surface being opposed to the sealing face 45 of the rotary sealing ring. The effect of the surface distortion would be to tend to close the minute gap between the faces 45 and 46, with the tendency to close the gap being more pronounced adjacent to the radially outer periphery of the sealing interface 45, 46 than adjacent to the inner periphery. Thus, the leakage of fluid radially inward through the interfacial gap 45, 46 would be diminished, resulting in deficient interfacial lubrication with attendant heating of and damage to the relatively rotating sealing rings.

But, in accordance with the present invention, the tendency of the stationary sealing ring sealing face 46 to become dished is substantially neutralized or counteracted. Referring to FIG. 1, it is seen that the backup ring 49 is supported by the flange 47 along a radially extending annular surface disposed radially inward from the ring of the backup ring and adjacent to its inner periphery. It will further be seen that there is a radially outer or peripheral portion 75 of the backup ring that provides a wall 76 contiguous to the annular chamber 54. It will also be seen that the portion 75 of the backup ring has another radially extending wall 77 on its side opposite to the wall 76. If a force parallel to the shaft axis is applied to the peripheral portion 75 of the backup ring, the peripheral portion will flex slightly into the annular chamber 54; when the force is relaxed, the peripheral portion will return to its normal position. Thus, it is seen that the peripheral portion 75 is cantilevered for movement into and out of the annular chamber 54. It will further be seen that if the pressure of the fluid in the seal cavity 73 is greater than the pressure of fluid in the annular chamber 54, the resultant fluid force will cause the portion 75 of the backup ring to be deflected into the chamber 54. The amount of the deflection will depend upon the magnitudes of the fluid forces that are exerted on the surfaces 76 and 77.

When the outer portion 75 of the backup ring is deflected in the manner just described, the backup ring assumes a dished configuration with its convex side facing the seal cavity 73, i.e., the backup ring becomes dished in the opposite sense from the flange 47. The distortion of the backup ring can be controlled to a degree that will substantially counteract the distortion of the flange 47. When such neutralization is achieved, the stationary sealing ring 51 is substantially undistorted, and the face 46 will be substantially parallel to the face 45; thus the mechanical seal will operate with proper leakage and lubrication between the sealing faces 45 and 46. If desired, however, the backup ring can be distorted sufficiently to warp the sealing surface 46 of the stationary sealing ring into a convex surface which will increase the rate of fluid leakage through the gap 45, 46, above that which would obtain with the faces 45 and 46 parallel.

The way in which the backup ring 49 is automatically flexed or deformed into dish shape to offset the curving of the flange 47 will now be described. It is well known that a pressure gradient obtains in the radial direction through the gap between the relatively rotating sealing faces 45 and 46, the pressure decreasing in the gap from a pressure equal to the fluid pressure in the seal cavity 73 at the outer circumference of the sealing interface 45, 46 to a pressure equal to the fluid pressure in the cavity 74 at the inner circumference of the sealing interface 45, 46. Thus, the fluid pressure at the ends 68 and 68 of the passages 67 and 67 through the stationary sealing ring 51 will be at a value intermediate the pressure in the spaces 73 and 74. In the exemplary device illustrated herein, the openings 68 and 68 are so located that the fluid pressure at such openings is less than the pressure in the seal cavity 73 by approximately 10 percent of the pressure differential between the radially outer and the radially inner edges of the sealing interface. Of course, in the manufacture of the mechanical seal assembly of the invention, the openings 68 and 68' may be so located radially of the sealing face 46 that any desired pressure intermediate the pressures in the spaces 73 and 74 will be attained. Since the annular chamber 54 is in fluid communication through the channels 72, 71, 67, and 67' with the openings 68 and 68', it is clear that the fluid pressure in the annular chamber 54 is substantially the same as the fluid pressure at the openings 68 and 68', such opening being located at points of equal pressure on the pressure gradient across the sealing interface.

With the pressure in the annular chamber 54 less than the pressure in the seal cavity 73, and with the walls 76 and 77 exposed respectively to these differing pressures, a resultant force acts upon the radially outer or peripheral portion 75 of the backup ring in a direction to cant it into the annular chamber 54. The amount of canting will depend upon the difference in the pressures acting on the surfaces 76 and 77. Such canting of the portion 75 of the backup ring deforms it into dish shape in a sense opposite to the dishing of the flange 47. The degree of convexity of the backup ring can be varied by the amount of the differential fluid pressure across the portion 75 of the backup ring, which can be controlled by the location of the openings 68 and 68' in the stationary sealing ring 51, also by the respective areas of the walls 76 and 77, and further by selection of the material from which he backup ring is made, with particular reference to the flexibility of the material. With these three variables to work with, it is possible to obtain accurate control of the configuration of the sealing face 46 of the stationary sealing ring.

A mechanical seal assembly in accordance with the present invention functions automatically to tend to maintain a desired leakage of lubricating fluid across the surfaces 45 and 46. If the sealing surface 46 should become more concave, the pressure at the openings 68 and 68' would fall, thereby reducing the pressure in the annular chamber 54. Assuming that the pressure in the seal cavity 73 remains unchanged, it is seen that such reduction in pressure increases the bending force acting on the outer portion 75 of the backup ring in a manner to increase its convexity. This, in turn, counteracts the concavity of the sealing surface 46 and reestablishes the desired relationship between the sealing surfaces 46 and 45. Conversely, if the sealing face 46 should become convex, the pressure in the annular chamber 54 would rise, thereby flexing the backup ring 49 to decrease its convexity, thus tending to restore the sealing surface 46 to its proper conformation.

From the foregoing descriptions, it will be seen that the present invention provides a mechanical seal assembly in which the objects of the invention are achieved. Various modifications may be made in the exemplary device herein shown and described without departing from the invention as defined in the claims. One such modification would be to combine the backup ring and the stationary sealing ring into a unitary sealing ring means.

I claim:

1. A mechanical seal assembly for sealing a rotary shaft to a housing having a shaft opening through which the shaft extend, said mechanical seal assembly comprising:
   a. rotatable sealing ring means mounted on the shaft for rotation therewith, said rotatable sealing ring means having limited movability axially of the shaft;
   b. nonrotatably sealing ring means;
   c. said rotatable and said nonrotatable sealing ring means having opposed, generally radial sealing surfaces disposed in relatively rotatable sealing relationship;
   d. said housing having a support flange surrounding the shaft, said flange supporting said nonrotatable sealing ring means on its side opposite to its said generally radial sealing surface and along an annular surface spaced radially inward from its outer periphery;
   e. said flange and said nonrotatable sealing ring means defining therebetween an annular cavity disposed radially outward from said annular surface;
   f. means for sealing said cavity;
   g. said nonrotatable sealing ring means having a cantilevered peripheral portion that is free to flex into said cavity;
   h. said peripheral portion having a first, generally radial annular surface contiguous to said cavity and exposed to the pressure of fluid therein, and a second generally radial surface on the opposite side of said peripheral portion and exposed to the pressure of the fluid within the housing; and
   i. fluid passage means extending through said nonrotatable sealing ring means and opening, at one of its ends, into the space between said sealing surfaces and, at the other of its ends, into said cavity.

2. A mechanical seal assembly for sealing a rotary shaft to a housing having a shaft opening through which the shaft extends, said mechanical seal assembly having:
   a. a rotatable sealing ring mounted on the rotatable with the shaft, said sealing ring having limited movability axially of the shaft;
   b. a nonrotatable sealing ring;
   c. said sealing rings having opposed, generally radial surfaces in relatively rotatable sealing relationship;
   d. a backup ring supporting said nonrotatable sealing ring on its side opposite to its generally radial surface;
   e. said backup ring and said nonrotatable sealing ring having opposed, generally radial sealing surfaces in stationary sealing relationship;
   f. said housing having a support flange surrounding the shaft, said flange supporting said backup ring on its side opposite to its said generally radial sealing surface, and along an annular surface spaced radially inward from its outer periphery;
   g. said flange and said backup ring defining therebetween an annular cavity disposed radially outward from said annular surface;
   h. means for sealing said cavity;
   i. said backup ring having a cantilevered peripheral portion that is free to flex into said cavity;
   j. said peripheral portion having a first, generally radial annular surface contiguous to said cavity and exposed to the pressure of fluid therein, and a second, generally radial surface on the opposite side of said peripheral portion and exposed to the pressure of fluid within the housing; and
   k. fluid passage means extending through said nonrotatable sealing ring and said backup ring, said fluid passage means opening, at one of its ends, into the space between said opposed, generally radial surfaces in relatively rotatable sealing relationship and, at the other of its ends, into said cavity.

3. A mechanical seal assembly as defined in claim 2, wherein said means for sealing said cavity comprise O-ring gasket means for sealing the rim of said cantilevered peripheral portion to said flange.

4. A mechanical seal assembly as defined in claim 3, wherein said means for sealing said cavity further includes second O-ring gasket means for sealing said backup ring to said flange adjacent to said annular surface that is spaced radially inward from the outer periphery of said backup ring.

5. A mechanical seal assembly as defined in claim 2, wherein said fluid passage means includes means providing an annular collector groove opening into said generally radial sealing surfaces in stationary sealing relationship between said backup ring and said nonrotatable sealing ring, a plurality of passageways in said nonrotatable sealing ring for communicating the space between said relatively rotatable sealing surfaces with said collector groove, and a further passageway communicating said collector groove with said cavity.

* * * * *

PO-1050
(5/69)

UNITED STATES PATENT OFFICE
CERTIFICATE OF CORRECTION

Patent No. 3,628,799   Dated December 21, 1971

Inventor(s) Winfred J. Wiese

It is certified that error appears in the above-identified patent and that said Letters Patent are hereby corrected as shown below:

Col. 1, line 22, "charged" should be --changed--;
      line 34, "assembly" should be --subassembly--;
      line 64, "and" should be --the--.
Col. 2, line 37, delete "a";
      line 49, "of" should be --on--.
Col. 3, line 23, "63" should be --63'--
      line 33, "67", second occurrence, should be --67'--;
      line 34, "68", second occurrence, should be --68'--;
      same line, cancel "One" and insert --into--
      line 35, "69", second occurrence, should be --69'--;
      line 40, "67", second occurrence, should be --67'--.
Col. 4, line 24, "ring" should be --rim--
      line 69, "68" should be --68'--; same line, "67", second occurrence, should be --67'--;
      line 73, "68", second occurrence, should be --68'--.
Col. 5, line 27, "he" should be --the--.
      line 59 (Claim 1), "extend" should be --extends--.
      line 63 (Claim 1), "nonrotatably" should be --nonrotatab:
Col. 6, line 20 (Claim 2), "the" first occurrence, should be --and--.

Signed and sealed this 29th day of August 1972.

(SEAL)
Attest:

EDWARD M.FLETCHER,JR.
Attesting Officer

ROBERT GOTTSCHALK
Commissioner of Patents